United States Patent [19]

Itagaki et al.

[11] Patent Number: 4,844,940
[45] Date of Patent: Jul. 4, 1989

[54] HARD BUTTER

[75] Inventors: Kazuo Itagaki, Tokyo; Toshimichi Yanagihara, deceased, late of Toride, by Hiromi Yanagihara, legal representative; Shouji Maruzeni; Nozomi Yasuda, both of Tokyo, all of Japan

[73] Assignee: Asahi Denka Kogyo Kabushiki Kaisha, Tokyo, Japan

[21] Appl. No.: 95,564

[22] Filed: Sep. 10, 1987

[30] Foreign Application Priority Data

Mar. 12, 1986 [JP] Japan .................................. 61-54117

[51] Int. Cl.$^4$ .............................................. A23D 5/00
[52] U.S. Cl. ..................................... 426/607; 426/601
[58] Field of Search ............... 426/603, 607, 631, 613, 426/601

[56] References Cited

U.S. PATENT DOCUMENTS

| | | | |
|---|---|---|---|
| 4,208,445 | 6/1980 | Cottier et al. | 426/607 |
| 4,348,423 | 9/1982 | Pairaud | 426/607 |
| 4,594,259 | 6/1986 | Baker et al. | 426/613 |

*Primary Examiner*—Donald E. Czaja
*Assistant Examiner*—Celine T. Callahan
*Attorney, Agent, or Firm*—Frishauf, Holtz, Goodman & Woodward

[57] ABSTRACT

The hard butter of the present invention comprises a fat which is obtained from the pericarp of the Chinese tallow tree by extraction optionally followed by fractionation and has a solid fat content of 80% or more, 60% or more and 0.5% or less at 20° C., 30° C. and 40° C., respectively. And the other hard butter of the present invention comprises 5 to 95% of the pericarp oil as defined above and 95 to 5% by weight of one or more fats selected from among, for example, sal fat, fractionated sal fat, fractionated shea fat, kokum fat, mango kernel fat, fractionated mango kernel fat and illipe fat.

8 Claims, No Drawings

HARD BUTTER

BACKGROUND OF THE INVENTION

1. Field of the Invention

This invention relates to a hard butter which comprises a fat obtained from the pericarp of the Chinese tallow tree (*Sapium sebiferum*).

2. Description of the Prior Art

An adult Chinese tallow tree, a deciduous shrub originating from China, attains a height of 5 to 10 m. The flowering time of this tree is from April to June and seeds thereof can be harvested from September to November. A seed of this tree is white, has a diameter of approximately 5 to 7 mm and contains a large amount of fats in its surface and kernel.

The fats obtained from the seeds of the Chinese tallow tree have been used merely in the preparation of candles and soaps hitherto. However there has been attempted to more effectively utilize the same as, for example, an ingredient of skin cosmetics (cf. Japanese Patent Laid-Open No. 183610/1983) or a substitute for petroleum.

Although the seed of this tree contains a large amount of fats in its surface and kernel, a fat obtained from the surface, i.e., pericarp oil, is completely different from that obtained from the kernel, i.e., kernel oil, in properties including physical ones.

For example, the kernel oil, which has an iodine value of 130 to 170 and is in the form of a liquid or a flowable matter at room temperature, falls within the category of a drying oil in a broad sense.

On the other hand, the pericarp oil has an iodine value of 25 to 45 and in the form of a solid at room temperature. it comprises palmitic and oleic acids as major fatty acids. The major triglyceride thereof is 2-oleo-1,3-palmitine.

The 2-unsaturated-1,3-saturated glycerides mainly comprising 2-oleo-1,3-palmitine contained in the pericarp oil amounts to 50% by weight or more and sometimes to approximately 75% by weight of the pericarp oil.

The pericarp oil further contains 5 to 30% by weight of trisaturated glycerides mainly comprising 1,2,3-palmitine.

SUMMARY OF THE INVENTION

We have studied on the pericarp oil of the Chinese tallow tree having the abovementioned composition in order to effectively utilize the same. As a result, we have found that it is available in a hard butter useful in tempered chocolates, thus completing the present invention.

The hard butter of the present invention comprises a fat which is obtained from the pericarp of the Chinese tallow tree by extraction optionally followed by fractionation and has a solid fat content of 70% or more, preferably 80% or more, 40% or more, preferably 60% or more, and 2% or less, preferably 0.5% or less, at 20° C., 30° C. and 40° C. respectively. More particularly, the hard butter of the present invention comprises 5 to 95% by weight of one or more fats selected from among, for example, sal fat, fractionated sal fat, fractionated shea fat, kokum fat, mango kernel fat, fractionated mango kernel fat and illipe fat.

DETAILED DESCRIPTION OF THE INVENTION

Pericarp oil may be extracted from the seeds of the Chinese tallow tree either by heating unground seeds in an aqueous solvent or by using an organic solvent such as n-hexane.

The pericarp oil thus extracted may be degummed with the use of, for example, phosphoric acid optionally followed by deacidification, bleaching or similar purification treatment(s).

This pericarp oil contains at least 5 to 6% by weight, and sometimes as much as approximately 30% by weight, of trisaturated glycerides. When these trisaturated glycerides are present in a chocolate in a large amount, they would result in an excessively high viscosity during the tempering process to thereby make the appropriate tempering impossible. Further they would lower the meltability in the mouth of the final product. Therefore it is preferable to remove a high-melting fraction comprising said trisaturated glycerides from the pericarp oil.

In addition, the content of 2-oleo-1,3-palmitine, which is the main ingredient of the aimed hard butter, varies from 50 to 75% by weight depending on the kind of the fat. Thus it is preferable to further remove a low-melting fraction, which comprises, for example, triunsaturated glycerides and monosaturateddiunsaturated triglycerides, from said pericarp oil to thereby effectively utilize the 2-oleo-1,3-palmitine.

An effective procedure for removing said high-melting and low-melting fractions is fractionation. The fractionation may be effected either by using an organic solvent such as n-hexane or acetone or by, for example, winterizing without using any organic solvent. Either method may be employed in the present invention. The solvent fractionation may be superior in the yield and accuracy, although solventless fractionation such as winterizing would also give a satisfactory result.

As a matter of course, a pericarp oil which has a solid fat content of 70% or more, 40% or more and 2% or less at 20° C., 30° C. and 40° C., respectively, can be used as such in a hard butter without fractionation.

The pericarp oil to be fractionated may have a saturated glyceride content of 20% by weight or less, preferably 10% by weight or less, and a 2-unsaturated-1,3-saturated glyceride content of 50% by weight or more, preferably 60% by weight or more, although these requirements might not be always satisfied.

Namely, a pericarp oil having a solid fat content of 70% or more, 40% or more and 2% or less at 20° C., 30° C. and 40° C., respectiveiy, would impart preferable physical properties such as snapping and meltability in the mouth to a hard butter.

A hard butter comprising a pericarp oil having the abovementioned properties has an excellent snapping and a preferable meltability in the mouth. However a chocolate comprising a large amount of said hard butter has a somewhat low thermal resistance and similar anti-blooming properties, compared with those comprising cocoa butter. Although the thermal resistance and anti-blooming properties of a hard butter comprising a pericarp oil alone would offer no problem in practice, it is possible to give a hard butter highly compatible with cocoa butter by blending the pericarp oil with other fat(s). It is also possible to bring the thermal resistance of the hard butter to the same level as that of cocoa butter and to enhance the anti-blooming properties of the former to a level exceeding that of the latter thereby.

Although the pericarp oil to be used in the present invention per se is a preferable hard butter, a hard butter highly compatible with cocoa butter can be obtained by blending 5 to 95% by weight of said pericarp oil with 95 to 5% by weight of one or more fats selected from among, for example, sal fat, fractionated sal fat, fractionated shea fat, kokum fat, mango kernel fat, fractionated mango kernel oil and illipe fat.

It is usually appropriate that the content of said pericarp oil in the abovementioned blend is within a range of 50 to 80% by weight. When a particularly high thermal resistance is to be achieved, the content thereof may be adjusted to a level of 5 to 50% by weight. While, when a particularly excellent meltability in the mouth is to be achieved, the content thereof may be adjusted to a level of 80% by weight or more.

As described above, an extremely excellent hard butter which has the characteristics of pericarp oil as well as various improved properties can be obtained by blending the pericarp oil with one or more fats selected from among, for example, sal fat, fractionated sal fat, fractionated shea fat, kokum fat, mango kernel fat, fractionated mango kernel fat and illipe fat. That is to say, a hard butter comparable to cocoa butter in physical properties can be obtained by varying the content of the pericarp oil. Furthermore a hard butter having an elevated thermal resistance or an improved meltability in the mouth can be obtained thereby. Thus various hard butter products can be prepared by employing the pericarp oil, which increases the usefulness of the same.

Each hard butter of the present invention comprising said pericarp oil optionally blended with the abovementioned fat(s) is highly compatible with cocoa butter, shows excellent workabilities such as tempering properties when used in the preparation of a chocolate, and gives a final product having preferable properties including snapping, meltability in the mouth and thermal resistance.

It is characteristic of the hard butter of the present invention comprising the above-mentioned pericarp oil originating from the Chinese tallow tree that said pericarp oil has a high solid fat content at 30° C. A middle-melting fraction obtained by fractionating palm oil, which is frequently used as a hard butter material, has a solid fat content of approximately 40% at 30° C. Compared thereto, the pericarp oil obtained from the Chinese tallow tree as used in the present invention is significantly superior in physical properties.

In addition, it is required to divide palm oil into three fractions in order to obtain the middlemelting fraction and yet the yield thus achieved is low, i.e. 40% or less. In contrast thereto, when the pericarp oil of the Chinese tallow tree is used as a starting material, a fractionated fat comparable to, or even exceeding, the middle-melting fraction of palm oil in qualities can be obtained in a higher yield by dividing the pericarp oil not only into two fractions but also into three fractions. Thus the cost for the production of hard butter can be significantly reduced thereby.

EXAMPLE

To further illustrate the present invention, the following Examples and comparative Examples will be given.

EXAMPLE 1

400 g of pericarp oil of the Chinese tallow tree (IV: 35.80), which had been deacidified and bleached, was dissolved in 1200 g of n-hexane at approximately 40° C. and cooled to 16° C. within 1.5 hour under stirring. After stirring the mixture at 16° C. for 30 minutes, the crystals thus formed were filtered and washed with 400 g of n-hexane at 12° C. The n-hexane was distilled off from the obtained filtrate to thereby give 340 g of fractionated Chinese tallow having a solid fat content of 87.5%, 71.2% and 0.1% at 20' C., b 30° C. and 40° C., respectively.

60% of the obtained fat was blended with 40% of fractionated sal fat (IV: 33.0) to give a hard butter. With the use of this hard butter, a chocolate of the following composition was produced by way of trial. The obtained chocolate showed an excellent snapping and a preferable meltability in the mouth.

| Chocolate Composition: | Part by Weight: |
|---|---|
| sugar | 50 |
| cacao mass | 35 |
| hard butter | 15 |
| lecithin | 0.4 |
| vanillin | 0.03 |

EXAMPLE 2

400 g of pericarp oil of the Chinese tallow tree (IV: 33.8), which has been deacidified and bleached, was molten at approximately 50° C. and then cooled to 30° C. within 1.5 hour under stirring. After stirring the oil at 30° C. for 30 minutes, the crystals thus formed were filtered to give 308 g of fractionated Chinese tallow (filtrate part) having a solid fat content of 85.3%, 62.3% and 0.1% at 20° C., 30° C. and 40° C., respectively.

60% of the obtained fat was blended with 40% of fractionated shea fat (IV: 32.6) to give a hard butter. With the use of this hard butter, a chocolate of the same composition as the one described in Example 1 was produced by way of trial. The obtained chocolate showed an excellent snapping and a preferable meltability in the mouth.

EXAMPLE 3

600 g of pericarp oil of the Chinese tallow tree (IV: 42.2), which had been deacidified and bleached, was dissolved in 1800 g of acetone at approximately 40° C. and cooled to 20° C. within 1.5 hour under stirring. After stirring the mixture at 20° C. for 30 minutes, the crystals thus formed were filtered and washed with 600 g of acetone at 16° C. The acetone was distilled off from the filtrate thus obtained to give 510 g of a fraction, to which 2550 g of acetone was added. Then the mixture was heated to approximately 40° C. and subsequently cooled to −2° C. within 1.5 hour. After stirring the mixture at −2° C. for 30 minutes, the crystals thus formed were filtered and washed with 900 g of acetone at −7° C. Thus 420 g of fractionated Chinese tallow (crystal part) having a solid fat content of 82.3%, 64.5% and 0% at 20° C., 30° C. and 40° respectively, was obtained.

90% of the obtained fat was blended with 10% of kokum fat (IV: 36.0) to give a hard butter. With the use of this hard butter, a chocolate of the following composition was produced by way of trial. The obtained chocolate showed an excellent snapping and a preferable meltability in the mouth.

| Chocolate Composition: | Part by Weight: |
|---|---|
| sugar | 46 |
| cacao mass | 25 |
| whole fat milk powder | 13 |
| hard butter | 10 |
| cocoa butter | 6 |
| lecithin | 0.4 |
| vanillin | 0.03 |

EXAMPLE 4

400 g of pericarp oil of the Chinese tallow tree (IV: 28.4), which had been deacidified and bleached, was dissolved in 1200 g of acetone under heating to approximately 40° C. Then the mixture was cooled to 22° C. within 1.5 hour under stirring. After stirring the same at 22° C. for 30 minutes, the crystals thus formed were filtered and washed with 400 g of acetone at 18° C. The acetone was distilled off from the obtained filtrate to thereby give 334 g of fractionated Chinese tallow having a solid fat content of 89.0%, 67.1% and 0% at 20° C., 30° C. and 40° C. respectively.

40% of the obtained fat was blended with 60% of fractionated sal fat (IV: 33.0) to give a hard butter. With the use of this hard butter, a chocolate of the same composition as the one described in Example 1 was produced by way of trial. The obtained chocolate showed an excellent snapping, a preferable meltability in the mouth and a high thermal resistance.

EXAMPLE 5

60% of pericarp oil (IV: 34.3) of the Chinese tallow tree having a solid fat content of 86.4%, 53.3% and 0.2% at 20° C., 30° C. and 40° C., respectively, was blended with 40% of fractionated sal fat (IV: 33.0) to give a hard butter. With the use of this hard butter a chocolate of the same composition as the one described in Example 3 was composition as the one described in Example 3 was produced by way of trial. The obtained chocolate showed an excellent snapping and a preferable meltability in the mouth.

COMPARATIVE EXAMPLE 1

60% of the same pericarp oil of the Chinese tallow tree as the one used in Example 1 was blended with 40% of fractionated sal fat (IV: 33.0) to give a hard butter. With the use of this hard butter, a chocolate of the same composition as the one described in Example 1 was produced by way of trial. The obtained chocolate showed a significant increase in viscosity during the tempering step and became waxy when melted in the mouth. The pericarp oil of the Chinese tallow tree as used hereinabove had a solid fat content of 90.4%, 80.3% and 13.7% at 20° C., 30° C. and 40° C., respectively.

COMPARATIVE EXAMPLE 2

60% of the same pericarp oil of the Chinese tallow tree as the one used in Example 2 was blended with 40% of fractionated shea fat (IV: 32.6) to give a hard butter. With the use of this hard butter, a chocolate of the same composition as that described in Example 1 was produced by way of trial. The obtained chocolate showed a significant increase in viscosity during the tempering step and became waxy when melted in the mouth. The pericarp oil of the Chinese tallow tree as used hereinabove had a solid fat content of 87.5%, 69.1% and 8.7% at 20° C., 30° C. and 40° C., respectively.

COMPARATIVE EXAMPLE 3

90% of the same pericarp oil of the Chinese tallow tree as the one used in Example 1 was blended with 10% of kokum fat (IV: 36.0) to give a hard butter. With the use of this hard butter, it was attempted to produce a chocolate of the same composition as the one described in Example 3. However it was impossible to effect the tempering and, thus, to mold the chocolate. The pericarp oil of the Chinese tallow tree as used hereinabove had a solid fat content of 85.3%, 65.7% and 10.4% at 20° C., 30° C. and 40° C., respectively.

COMPARATIVE EXAMPLE 4

40% of the same pericarp oil of the Chinese tallow tree as the one used in Example 4 was blended with 60% of fractionated sal fat (IV: 33.0) to give a hard butter. With the use of this hard butter, it was attempted to produce a chocolate of the same composition as the one described in Example 1. However it was impossible to effect the tempering and, thus, to mold the chocolate. The pericarp oil of the Chinese tallow tree as used hereinabove had a solid fat content of 89.5%, 79.8% and 15.1% at 20° C., 30° C. and 40° C., respectively.

What is claimed is:

1. A hard butter comprising a fat which is obtained from the pericarp of the seeds of the Chinese tallow tree by extraction followed by fractionation from which both high-melting and low-melting fractions have been removed through said fractionation and has a solid fat content of 80% or more, 60% or more and 0.5% or less at 20° C., 30° C. and 40° C., respectively.

2. A hard butter comprising 5 to 95 % by weight of a fat which is obtained from the pericarp of the seeds of the Chinese tallow tree by extraction followed by fractionation from which both high-melting and low-melting fractions have been removed through said fractionation and has a solid fat content of 80% or more, 60% or more and 0.5% or less at 20° C., 30° C. and 40° C., respectively and 95 to 5% by weight of fats selected from the group consisting of sal fat, fractionated sal fat, fractionated shea fat, kokum fat, mango kernel fat, illipe fat and mixtures thereof.

3. The hard butter as set forth in claim 2 wherein sal fat or fractionated sal fat is used.

4. The hard butter as set forth in claim 2 wherein fractionated shea fat is used.

5. The hard butter as set forth in claim 2 wherein kokum fat is used.

6. The hard butter as set forth in claim 2 wherein mango kernal fat or fractionated mango kernal fat is used.

7. The hard butter as set forth in claim 2 wherein illipe fat is used.

8. A hard butter comprising 50 to 80% by weight of a fat which is obtained from the pericarp of the seeds of the Chinese tallow tree by extraction followed by fractionation from which both high-melting and low-melting fractions have been removed through said fractionation and has a solid content of 80% or more, 60% or more and 0.5% or less at 20° C., 30° C. and 40° C., respectively and 50 to 20% by weight of fats selected from the group consisting of sal fat, fractionated sal fat, fractionated shea fat, kokum fat, mango kernel fat, fractionated mango kernel fat, illipe fat and mixtures thereof.

* * * * *